United States Patent
von Groll et al.

(10) Patent No.: US 8,069,101 B1
(45) Date of Patent: Nov. 29, 2011

(54) FINANCIAL METHODOLOGY TO VALUATE AND PREDICT THE NEWS IMPACT OF MAJOR EVENTS ON FINANCIAL INSTRUMENTS

(75) Inventors: Goetz von Groll, Zurich (CH); Dag Dyrdal, Oslo (NO); Stoyan Mihov, Sofia (BG); Christofer Solheim, London (GB)

(73) Assignee: CommEq Asset Management Ltd., London (GB)

( * ) Notice: Subject to any disclaimer, the term of this patent is extended or adjusted under 35 U.S.C. 154(b) by 166 days.

(21) Appl. No.: 11/308,886

(22) Filed: May 22, 2006

Related U.S. Application Data

(60) Provisional application No. 60/595,175, filed on Jun. 13, 2005.

(51) Int. Cl.
G06Q 40/00 (2006.01)
(52) U.S. Cl. .................................. 705/35; 705/36 R
(58) Field of Classification Search ............. 705/36 R, 705/1, 35, 37
See application file for complete search history.

(56) References Cited

U.S. PATENT DOCUMENTS

| | | | | |
|---|---|---|---|---|
| 5,761,442 A * | 6/1998 | Barr et al. | ...... | 705/36 R |
| 6,125,355 A * | 9/2000 | Bekaert et al. | ...... | 705/36 R |
| 6,236,980 B1 * | 5/2001 | Reese | ...... | 705/36 R |
| 6,622,140 B1 * | 9/2003 | Kantrowitz | ...... | 707/5 |
| 7,467,108 B2 * | 12/2008 | Papka | ...... | 705/36 R |
| 2003/0135445 A1 * | 7/2003 | Herz et al. | ...... | 705/37 |
| 2003/0187772 A1 * | 10/2003 | Papka | ...... | 705/36 |

OTHER PUBLICATIONS

"Using Neural Networks to Forecast Stock Market Prices". Ramon Lawrence. University of Manitoba. Dec. 12, 1997.*

* cited by examiner

*Primary Examiner* — Olabode Akintola
*Assistant Examiner* — Kellie Campbell
(74) *Attorney, Agent, or Firm* — Buckley, Maschoff & Talwalkar LLC

(57) ABSTRACT

A financial methodology for the analysis of events' impact on media coverage and business, and predictive indications of movements of stock prices (or other financial instruments) triggered by media and business impact is described. The methodology is based on a numerical approach suitable for processing by a computer. It takes into account data outside the traditional realm of finance, such as public sensitivity to certain classes of events, and the correlation between media coverage and stock price performance during the course of an event.

14 Claims, 7 Drawing Sheets

FINANCIAL METHODOLOGY TO VALUATE AND PREDICT THE NEWS IMPACT OF MAJOR EVENTS ON FINANCIAL INSTRUMENTS

CROSS-REFERENCE TO RELATED APPLICATIONS

This application is based on, and claims benefit and priority to Patent Application Ser. No. 60/595,175, flied on Jun. 13, 2005.

BACKGROUND OF THE INVENTION

The disclosed method concerns the prediction of the short term movements in the stock price of publicly traded corporations in periods of sudden and material change, with a particular focus on corporate crisis scenarios. Crisis-type stock price dynamics have been the subject of detailed analysis and modeling in the past, both academic and commercial. This is hardly surprising; billions of dollars are lost or, in some cases, earned, in the highly volatile dynamics which follow the news of such sudden events. The input parameters of existing predictive impact models are typically the financial attributes of the event itself and the companies involved. The disclosed method augments this approach with a new and fundamentally different class of attributes; communication parameters which can be used to predict the media impact of different types of events. The number of potential or actual stock owners who learn of a crisis, almost simultaneously and usually within the first 24-hour period following the crisis breaking, has a major impact on the demand/supply balance for the stock and therefore on the price. A prediction of a change in a stock price is a prediction of a shift in demand/supply, which in turn relies implicitly on assumption about the timing, tonality, quantity, prominence and audience reach of news coverage.

The disclosed method proceeds from the recognition that the business attributes of the event itself, and of the subject company, are often poor predictors for the volume and tonality of the media coverage, through which medium the markets will be informed and kept up-to date of the event/crisis. It is not that these parameters are invalid, but they are insufficient. As the disclosure will demonstrate, a sudden event or crisis and the corporation impacted by it, are associated with communication parameters as well as the business parameters already used by existing prediction models. These communication parameters include factors such as the quality of photographs, the level of convergence with current public concerns or fashions and the level of positive or negative endorsement by key influencers. The disclosed method permits the identification of such communication parameters for different types of events and it provides quantification of both the influence on the news coverage and on the resultant stock price movements.

The central principle of the methodology is that the communication factor can be derived by a three-step process: a) identify all the parameters with high correlations against stock price movements b) identify all the parameters which have a high correlation against the media impact c) all the parameters which have a high correlation against both the media and stock price are the ones with the highest predictive potential. It may be counter-intuitive that a parameter such as the quality of the photographic material is treated as the dual business/communication parameter rather than purely a communication parameter. However, parameters which impact on the reportage of an event will also influence the level of confidence in a stock and therefore the price.

A related application (U.S. Provisional Patent Application No. 60/595,175 filed on Jun. 13, 2005) has been filed for examining the non-sudden but more sustained spread between analyst targets and stock prices by analyzing how investor confidence is influenced continuously by media coverage.

BRIEF SUMMARY OF THE INVENTION

Securities analysts and many investors employ quantitative valuation models of financial instruments. For readability the description in this document will by way of example sometimes refer to stock prices, however, it is understood that the methodology is applicable to other financial instruments, such as, but not limited to, bonds, currencies, commodities contracts, or indeed derivative constructs of those asset classes. Financial instruments will typically be analyzed in conjunction with related instruments, e.g. in the case of company stock prices together with the related industry index. The methodology described herein is concerned with extending such models of pricing financial instruments to include the impact of sudden financially sensitive events, such as, but not limited to, industrial accidents, earnings warnings and product withdrawals. Depending on the financial instrument in question, the main media attention may not necessarily involve companies, but could just as well relate to governments or other organizations, commodities, and so forth. The methodology comprises the following principal processes:

(1) Training: Compiling correlation reference material (FIG. 1)

Data collection and preparation (101)

Categorization of event classes and event parameters (102)

Population of event classes and event parameters (103)

Modeling the impact of media coverage around events on financial instruments (104)

Evaluation of the modeling results and refining the model to enhance the precision (105)

(2) Real-time Prediction (FIG. 6)

Evaluate coverage from news wires and broadcast immediately following an event, in particular communication parameters such as short term media coverage volume and tonal balance (601)

Retrieve financial parameters of affected financial instrument(s) (602)

Determine event parameters (603)

Model execution: Forecasts the short term impact of the event with particular consideration of the effect on media coverage and the subsequent effect on the short term price movement of the financial instrument(s) (604)

Post-mortem analysis of the results and refinement of model (606)

The building (104) and execution (604) of these models—numerical in nature—require the properties of the financial instruments and media coverage to be captured in quantitative parameters. Examples of communication parameters are volume of articles published per day, the weight of the publications in which the articles are published, the tonality of the articles. Tonality is a parameter to capture the sentiment expressed in the media, for example in determining if an article on a particular issue as positive or negative from the perspective of the subject company. In order to apply tonality in the disclosed methodology, it needs to be cast into quantitative terms. Further parameters may be the editorial attention time span for a specific issue (e.g. number of days until messages are subsiding to 10% of maximum coverage per day), any reference to stock price impact in early media coverage or any reference to other problems in the same company within the initial coverage.

Financial parameters include the trading volume and price movement of the instrument itself (e.g. stocks), its derivatives (e.g. options), and benchmarks (e.g. indices). Additional financial parameters such as the (abnormal) return or volatility over a given period can be calculated based on the price movement and other primary financial parameters. Examples of further parameters related or useful as context to the financial instrument are overall market volatility, industry volatility, background economic data such as consumer confidence indices, house prices and recent interest rate developments, % stock ownership of individuals and institutions, corporate profit/earnings benchmarked against industry, long term dividend record.

BRIEF DESCRIPTION OF THE SEVERAL VIEWS OF THE DRAWINGS

Exemplary embodiments will be described in relation to the following figures wherein.

DETAILED DESCRIPTION OF THE INVENTION

For illustration of the principles and operational characteristics of this method it is helpful to present an example. The following example shows the method for building the model and training it for the separate prediction of the media volume/tonality and the stock price impact resulting from a product withdrawal.

Figure 1:
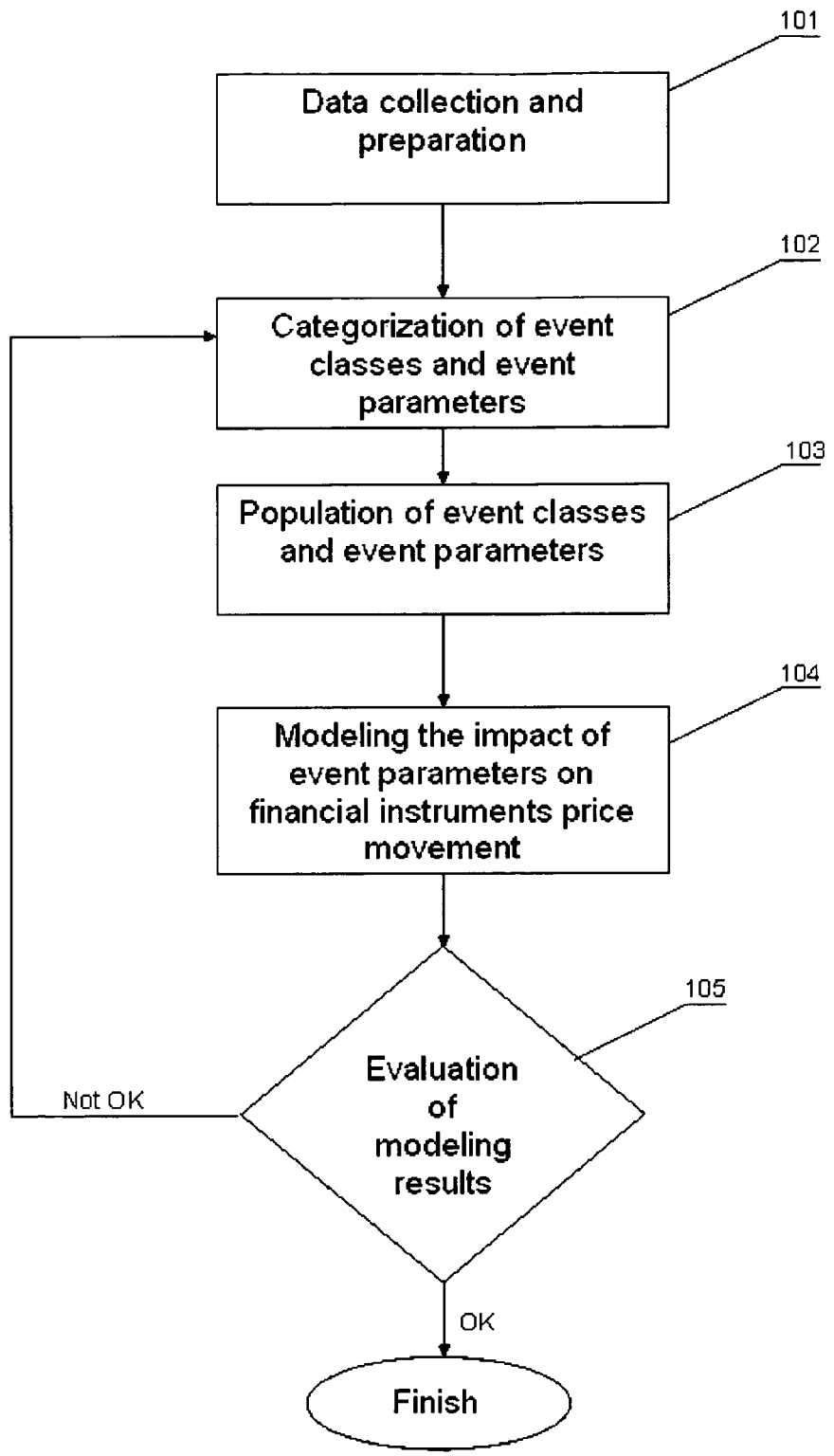
FIG. 1 illustrates exemplary processes for establishing a trained model of an exemplary embodiment of the disclosed method.

The process is presented in the flowchart given in FIG. 1. The detailed description of the individual steps is presented herein. The process begins with the data collection and preparation (101). Afterwards the events are categorized into event classes and the parameters specific to each of the particular event classes are determined (102). In the current example the event class is "product withdrawal" and the event parameters are given in Table 1 (A-J).

Next, a number of similar accidents in the past are analyzed. The data from the events are populated into the event parameters (103). The way it is done for a specific event is illustrated in the prediction process example provided herein.

The content of Table 1 presents the parameters of three historical products withdrawals that have happened to the companies X, Y and Z.

TABLE 1

| Company | X | Y | Z |
|---|---|---|---|
| A. Product sales/revenue | 21% | 5% | 41% |
| B Expected sales reduction | 45% | 100% | 18% |
| C. Fatalities | 1 | 7 | 15 |
| D. Casualties | 0 | 30 | 6 |
| E.1. Initial media volume (weighted) | 3 | 5 | 6 |
| E.2. Initial media tonality (weighted) | −9 | −3 | −6 |
| G. Crisis management quality | 12% | 0% | 90% |
| H. Expected litigation risk | $0M | $12M | $10M |
| I. Event resonance | 4 | 0 | 2 |
| J. Event location weighting | 100% | 40% | 0% |
| K. Impact on media volume | 215 | 428 | 350 |
| L. Impact on media tonality | −1 | −5 | −4 |
| M. Business impact | −9 | −3 | −6 |
| N. Short term stock price impact | −7.5% | −11% | −10% |

The parameters A-J are the basis on which the prediction is based. The initial parameter set is event specific and is not limited to the items given in this example. In particular, the possible inclusion of financially non-obvious parameters such as quality of photos (determines to a large degree prominence of coverage) is noted here. For each of the initial parameters specific normalization is applied. For example the normalization of the expected litigation risk $H_N$ is derived by dividing the litigation risk to the company's revenues: $H_N = H/$Revenues and for the normalized value of Fatalities ($C_N$) we may use log(C).

Figure 7:
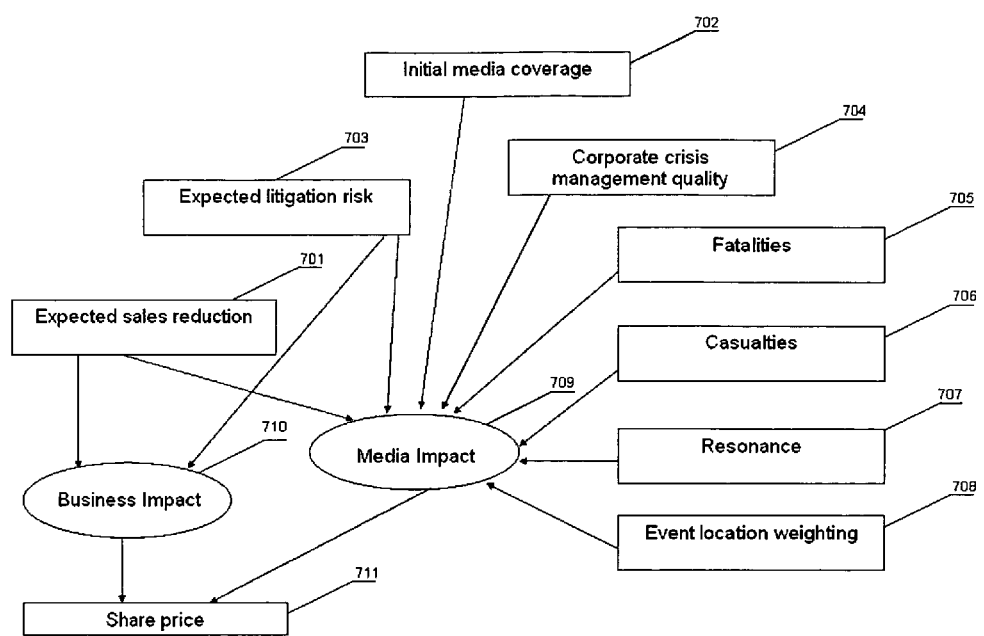
FIG. 7 illustrates an exemplary structural equation model relating event parameters to output thereby forming part of the process of FIG. 6 in an exemplary embodiment of the disclosed method.

The model is created by using factor analysis, structural equation modeling, neural networks and other methods. For the corresponding example the model is presented in FIG. 7. Using structural equation modeling the following equations for expressing (1) the media coverage and (2) tonality; and (3) the short term stock price impact are derived:

$$K_N = 0.1A_N + 0.3B_N + 1.1C_N + 0.3D_N + 0.2E1_N - 0.6E2_N + 1.3F_N + 0.1G_N + 0.4H_N + 0.2I_N \qquad (1)$$

$$L_N = -0.3A_N - 0.2B_N - 0.1C_N - 0.3D_N - 1.3E1_N + 1.1E12_N - 0.3F_N - 0.5G_N - 0.3H_N - 0.3I_N \qquad (2)$$

$$M_N = 0.5A_N + 0.2H_N \qquad (3)$$

$$N_N = 1.4K_N - 2.3L_N + 4.8M_N \qquad (4)$$

Training Process

An overview of the training process is given in FIG. 1, and the sub-processes depicted therein are described in more detail in the following section.

Figure 2:
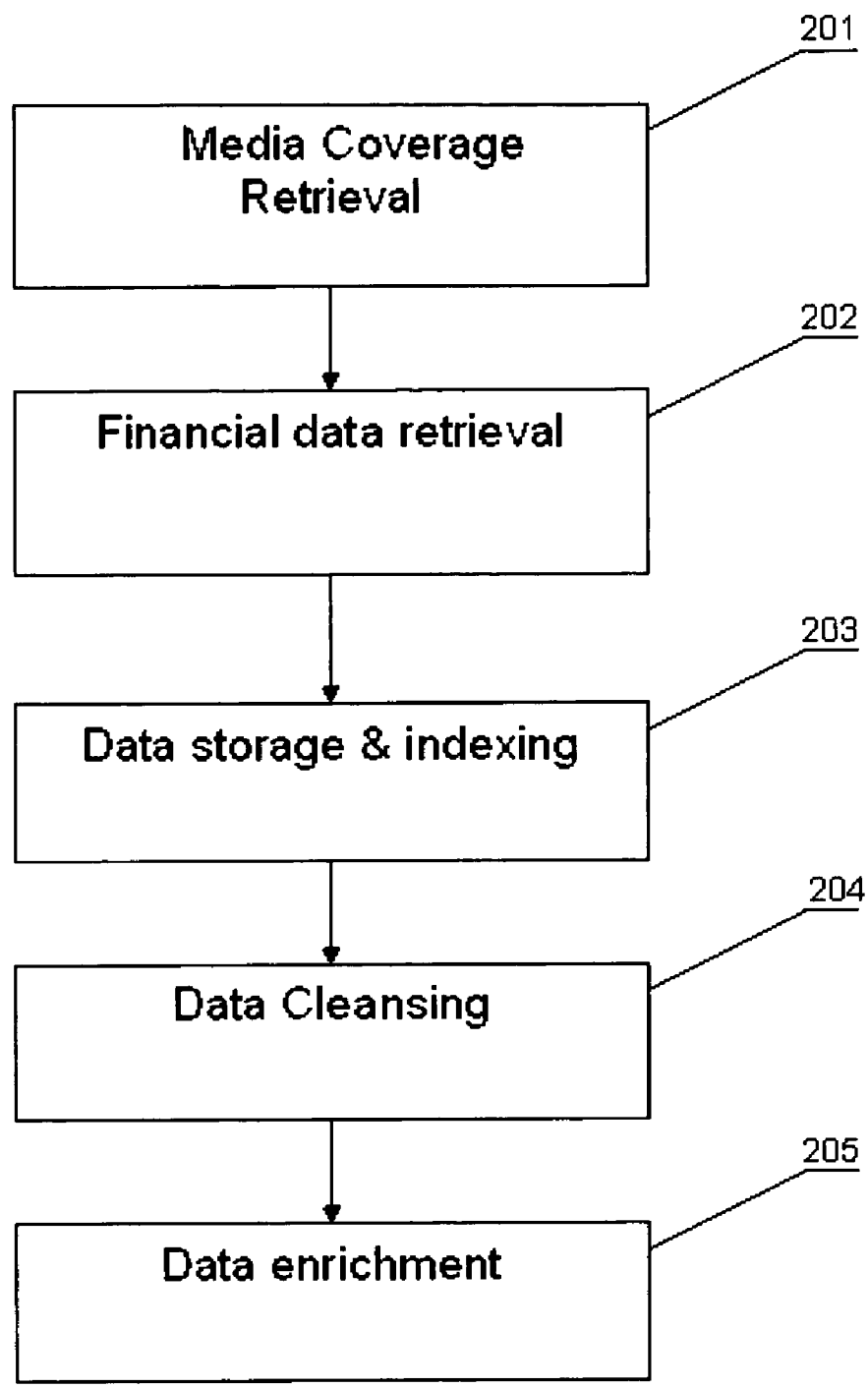
FIG. 2 illustrates exemplary processes for data gathering, cleansing, and enrichment of an exemplary embodiment of the disclosed method.

Data collection and preparation (101 in FIG. 1 and entire FIG. 2): There are various aspects to the task of data preparation, such as data gathering, storage & indexing, cleansing, and enrichment. These tasks are typically carried out by a computer system with features such as:

Data gathering consists of retrieving media and financial data (201 and 202, respectively) from different providers. An example of an embodiment of the gathering process is as follows: a human being specifies in a graphical user interface (GUI) of the computer system the details of the desired data sets, such as date ranges and companies. The computer system transforms the user entry to send an HTTP request to the service provider, where the URL used in the HTTP request contains the query details such as the date ranges and desired objects. The service provider responds with delivering (also via HTTP) an XML or comma separated value (CSV) file (the news or financial feed).

Data storage & indexing (203) consists of parsing the retrieved information and storing it in a structured way such as a computer database. The computer database is either linked by a computer network to or is part of the computer system that gathered the data. The database needs to ensure by its design the connection between various data sub-sets organized in tables. For reasons set out in the description of the data processing in the latter section of this document, it is beneficial to store and index articles according to such data elements as article title, the publication it appeared in, the date of publication, as well as a summary or article "snippet".

Data cleansing (204) consists of removing or adjusting parameter values that would hinder the correct subsequent processing of the data. While news is generated and dispersed through media virtually every day of the year, this is not true for all financial markets. While in many cases there is the possibility to trade a financial instrument in after-hour markets, the main exchanges are closed during weekends and public holidays. Furthermore, sometimes a particular financial instrument of interest is suspended from trading on a particular exchange. A further integral part of the cleansing is to properly account for stock splits and dividend payments.

Data enrichment (205) consists of adding data elements that were not included in the data feed of the service providers. For example in the current embodiment, the publications are identified in the news feed by name, but their distribution volume, geographical location of main readership, type of publication such as general daily newspaper or specialist weekly trade magazine are added to the database manually. Such a categorization allows to classifying and weighting the importance of articles by publication.

Figure 3:
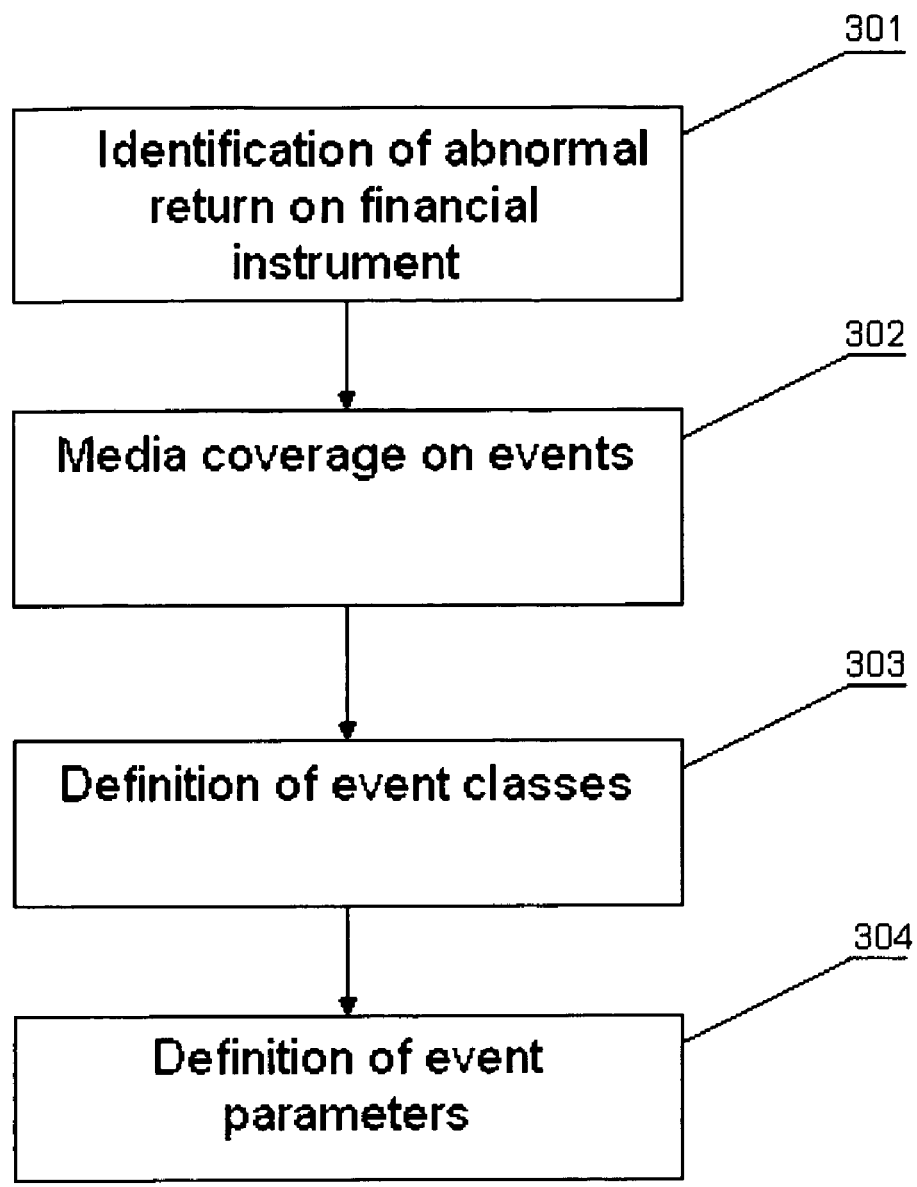
FIG. 3 illustrates exemplary process for event identification, classification, and parameterization of an exemplary embodiment of the disclosed method.

Categorization of event classes and event parameters (102 in FIG. 1 and entire FIG. 3): Given the data of historical events, and corresponding press coverage and prices movements of financial instruments gathered in process 101, with a subsequent process 102 one can categorize the events. The events of interest are related to a period of abnormal return of a financial instrument (stock price gain or loss driven primarily by the impact of the event rather than normal business operations/conditions). In a first sub-process 301 one can identify the abnormal return of a financial instrument by various filtering approaches, e.g. filtering the returns above a certain value, either in absolute terms or relative to a peer group (basket/index). In a following sub-process 302 the media coverage related to the abnormal return is being processed. Media coverage published at the time of the abnormal return is filtered for relevance to the abnormal return, for example using filter criteria such as publication date and key-word search of the object (company) experiencing the abnormal return. In a following sub-process 303, the event as covered in the media causing the abnormal return is identified and categorized into classes. Examples of such events are, but are not limited to: Government Probes; Product Safety; Product Approvals/Recalls; Terrorism; Resignations; Industrial Accidents; Corruption/Bribes; Strikes; Significant Lawsuits.

After categorizing the events into classes, the corresponding parameters for each class are extracted (304). See the possible, but by no means exhaustive list of parameters in Table 1.

It is straight forward that significant events can strongly impact the price of a related financial instrument. The example provided herein shows how a particular product withdrawal event can be defined for the purposes of this methodology with the parameters specified in Table 2. This categorization of events 303 and extraction of event parameters 304 may be carried out by a human expert or alternatively/additionally by computer-aided clustering mechanisms such as self-organizing maps (SOM, single-layer rectangular-shaped neural networks with unsupervised learning). Where the human expert is judging out of experience and business insight which parameters are relevant, the computer-aided mechanisms look for commonalities of media coverage features in each event class to extract parameters as promising candidates. The definition of the event classes and the event parameters can be refined in a feedback loop via sub-process 105.

Figure 4:
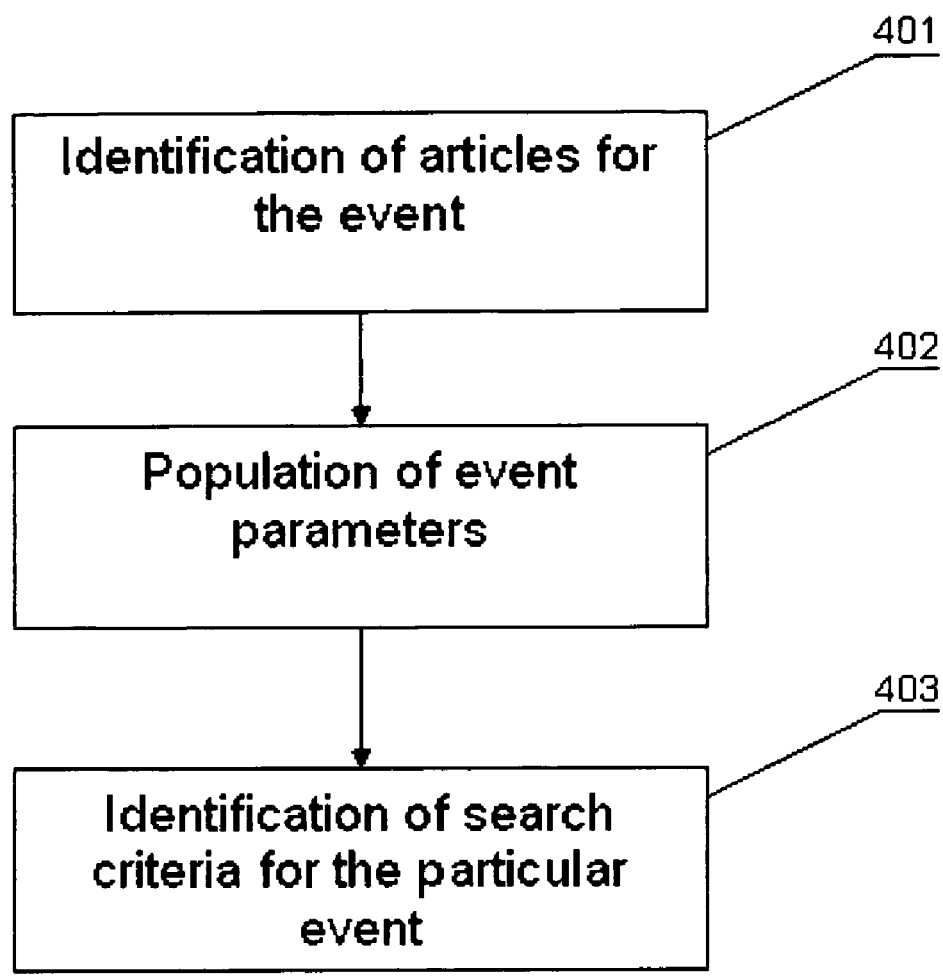
FIG. 4 illustrates exemplary process creating event instances with individual event data of an exemplary embodiment of the disclosed method.

Population of event classes and event parameters (103 in FIG. 1 and entire FIG. 4): Once the event classes and event parameters have been determined, historical events can be mapped to these classes and their event parameter values can be extracted. In sub-process 401, for each historical event the relevant media coverage is filtered out, identified, and allocated to the relevant event class. In sub-process 402, the event parameter values for each historical event are being extracted. The set of event parameters is specific to the event class, although more than one event class may use a particular parameter. In a sub-process 403, the search criteria for this particular event are being identified and stored with search criteria of other historical events of the same class. The purpose of this sub-process 403 is to aid the development of automatic identification of media coverage of a particular event class.

Figure 5:
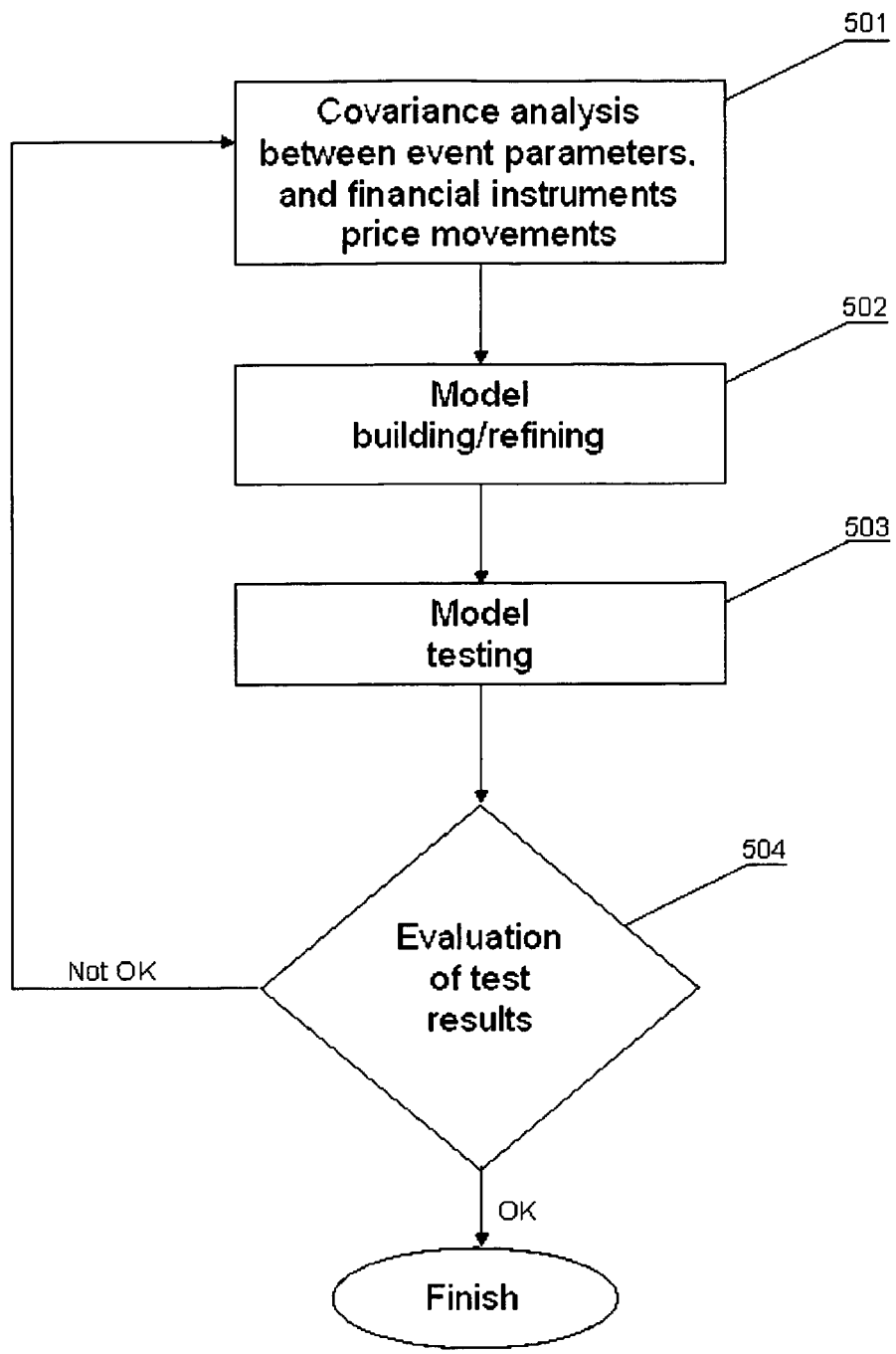
FIG. 5 illustrates exemplary processes for establishing a model for determining media influence of reported events in an exemplary embodiment of the disclosed method.
Figure 6:
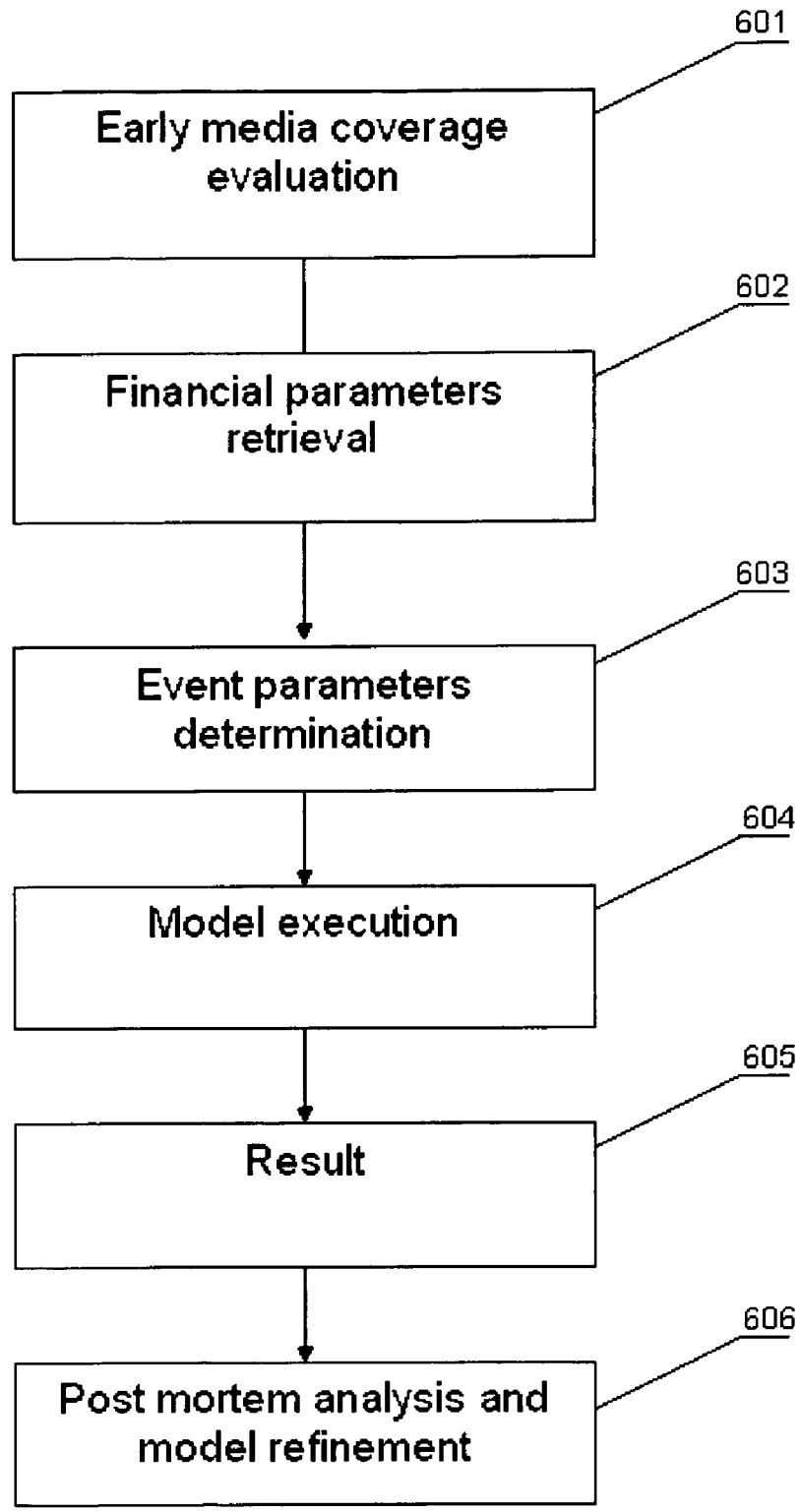
FIG. 6 illustrates exemplary processes for outputting values based on analysis using the model of FIG. 1 in an exemplary embodiment of the disclosed method.

Modeling (104 in FIG. 1 and entire FIG. 5): A covariance analysis (501) is being carried out between said event parameters and parameters of the financial instruments. As the parameter values have been identified in the preceding sub-processes, this analysis (501) can be carried out automatically without any human interaction.

Based on those covariance values that indicate a high degree of correlation and statistical significance, one can build or refine in sub-process 502 a model of how the events and their media coverage influence the price movement of the financial instrument. The fields of psychometric and econometric modeling have provided known research on the actual details of an analytical extraction of correlation coefficients, and modeling cause and effects, for example via factor analysis or structural equation models (SEM) that can contain exogenous, endogenous, observed, and latent variables. Alternatively, a more numerically driven approach may be used with such tools as multilayered feed-forward neural networks (or similar) with supervised learning (back-propagation, simulated annealing, genetic algorithm, and others). The overall methodology for quantitative indication of the influence of certain events to stock price movements described herein is not limited to one specific choice of correlation analysis, although the approaches' pros and cons with respect to this utility is an interesting field of further research.

In a sub-process 503 the model is tested against historical data that has not been set aside and not been used in the building of the model (502). A decision in sub-process 504 determines whether the model is deemed to fit the data sufficiently well, and the process Modeling (104) is complete, or whether any discrepancies in the fit are sufficiently large as to warrant the refinement of the model in sub-process 502. The existing embodiment of the invention currently does not include an automated feedback loop 504 to 502 whereby insights gained during testing are automatically adjusting the coefficients in the model. However, we aim to pursue such automated feedback loops in a further embodiment of the invention. Studies in particular in the field of neural networks are describing various approaches of a feedback implementation.

Real-Time Prediction

As initially described in the overview section of this document, after building the numerical model its operational usage is to predict the influence of the event parameters on the media impact and business impact and their influence on the price movement of a financial instrument.

At the occurrence of a given event (for example a corruption case), the user will retrieve in a process 601 initial media coverage of the event, and the financial parameters in process 602. The actual retrieval processes may well be the same as described in the data collection process 101, with the distinction of course that actual data on media coverage and price movement of the financial instrument only becomes available as the event unfolds. In a following process 603 the user will then query a database of event classes and their related parameters. If the user finds a suitable event class for the given event, he will then extract the related parameter values from the news about the current event in sub-process 603. In sub-process 604, the parameter values are then applied in conjunction with the relevant communication and financial parameters to the numerical model (an example of how to apply those values for prediction is given in the next paragraphs. This process 604 is similar to the one described under model testing 503, only that output 605 is the actual prediction upon which the user can act.

In order to illustrate the prediction process, a fictitious simple example is given: At 14:23 Jun. 2007 a highly negative study is published on the side effects of a specific cancer drug named Extundum. The trials were conducted in the UK on a population of 1,000 participants. The drug is owned and produced by Innovarium Pharmaceutical Inc, listed on the New York stock exchange. Patients who suffered side effects: 30 became ill (casualties), 13 died from the complications (fatalities). There is some increased sensitivity, as early reports suggest that Innovarium may have hidden a previous internal study. The sales of Extundum accounts for 18% of Innovarium's global revenues, but accounts for 22% of Innovarium's revenues in the market where the study came out (UK). The handling of the corporate crisis is handled without any CEO visibility, but the corporate response includes the standard messages associated with best practice. Further, the UK's National Institute for Clinical Excellence (NICE) had fast-tracked the drug's approval, and there is already an on-going and rising debate on the safety of the fast-tracking. NICE itself is in the news for the slow standard approval process, which in turn created the need for a fast-track arrangement.

The parameters that need to be extracted for the prediction (see FIG. 7) are the same parameters that have been used in the section of the training process in the example of a product withdrawal given therein. This paragraph illustrates an approach of how to extract said parameters (see Table 2 below with populated values for the parameters). The importance of the product is expressed as a percentage of product sales over total corporate revenue (this may be a vector accounting for different figures in different markets). An expert takes a view on how likely a full product withdrawal is (resulting in 100% loss of the product sale) in the various markets and the likelihood of continued sales, albeit at reduced level due to the reputational damage. This leads to a value for the Expected Sales Reduction 701. Initial media coverage is measured by a vector of which news wires are picking up the story and their tonality, multiplied with a weighting for the importance of the news wire in the affected markets. In this example we weight Associated Press with 5 (main wire for the US, where the company is listed on the stock exchange), and Reuters (main wire for Europe where the story breaks) with a 4. The quality of the corporate crisis management 704 is computed from the number of mentions that a company spokesperson gets, the number of CEO interviews and citations, as well as whether concern and apologies are expressed in the early media coverage of this event. These values are combined into a single score to be put into the model. 705 and 706 are the number of fatalities and casualties in this event, respectively. Resonance 707 is a parameter that takes into account whether there is an ongoing public concern that predates this event and which is likely to amplify the discussion around this event. In this example, this is the case with the debate on safety of fast-track drug approval processes. An embodiment for deriving this parameter value is the multiplication of the explicit references in the media coverage of the event times the number of articles about the public concern in the past 6 months. The event location weighting parameter 708 accounts for the weighted distance of the event to the main trading market of the financial instrument (=100% for an event in the US for a US listed company, 70% for a pan-European event for a US listed company). See Table 2 below for an overview of the parameters and their values.

TABLE 2

| Company | Innovarium |
|---|---|
| A. Product sales/revenue | 18% |
| B. Expected sales reduction | 3.5% |
| C. Fatalities | 13 |
| D. Casualties | 30 |
| E.1. Initial media volume (weighted) | 6 |
| E.2. Initial media tonality (weighted) | −2 |
| G. Crisis management quality | 12% |
| H. Expected litigation risk | $7M |
| I. Event resonance | 76 |
| J. Event location weighting | 70% |
| K. Impact on media volume | 215 |
| L. Impact on media tonality | −4 |
| M. Business impact | −9 |
| N. Short term stock price impact | −16% |

Based on these parameters the model can compute its intermediate and final results. The intermediate results are the expected media coverage volume/tonality and the business impact of the event.

The media and business intermediate results lead to a final prediction of a stock price forecast of −14% to −18% against a normal return.

Subsequently, the actual price movement data will be available, and the prediction can be analyzed against this benchmark in a post-mortem analysis 606. The process of analyzing and model refining is similar as described under 504.

Once the parameters have been provided, the predictive models will produce predictions for the next day and for subsequent time points. The length of time between the time points may be varied for different event types. The model will also provide a confidence coefficient for the predictions, expressing the error variances.

The model may be applied for predictions at different points in time, in such a way that different coefficients are used for each of the time-point predictions, even for the same parameter. By way of example; the model to predict the media tonality prediction for day 2 differs in key respects from that used to predict the media tonality for day 28. Different coefficients are also used to predict the different types of outputs for the same time point.

In the final step the minimum and maximum values for each predicted factor are calculated, for each of the time points and for each of the output factors.

Predictions may be distributed to clients (e.g., in the form of a table) for any of the following business purposes:

- Seeking short term capital gain through buying or selling stocks or bonds in the subject company, including short-selling.
- This could be provided by offering integration into other equity valuation models, or by supplying a black-box trading facility
- Crisis management training, planning and preparations
- Service may either be provided as one-off reports or an ongoing subscription.

What is claimed is:

1. A computerized method, comprising:
   identifying an event having an association with a financial instrument;
   classifying said event into at least one of a plurality of predefined event classes;
   retrieving media data associated with media coverage of said event and extracting data elements from said media data, wherein said data elements include at least one quantified communication parameter including at least one of a short term media coverage volume, a publication weight, a tonal balance, and an impact of available photographs;
   retrieving current financial parameters associated with said financial instrument;
   generating, as an intermediate result of the method, a prediction of the upcoming media coverage of said event including a predicted volume and tonality of said upcoming media coverage, wherein said intermediate result is generated using a modeling computer system, a numerical model, said extracted data elements and said current financial parameters; and
   generating, using the modeling computer system and using a numerical model and said extracted data elements, said current financial parameters and said intermediate result, a predicted financial impact of said event on a price of said financial instrument.

2. The computerized method of claim 1, wherein said generating an intermediate output of said numerical model further comprises generating a predicted business impact of said event.

3. The computerized method of claim 1, wherein said at least one of a plurality of predefined event classes is at least one of: government probe, product safety, product approval, product recall, terrorism, resignation, industrial accident, corruption, bribe, strike, lawsuit, licensing, patent award, patent expiration, regulatory event, legislative change, boycott, accounting irregularity, prosecution, discrimination, insider trading, corporate manslaughter, injury or death related to product safety, incapacity of corporate officer, stockmarket delisting, stockmarket suspension, resignation, and act of God.

4. The computerized method of claim 1, wherein said plurality of predefined event classes are created in a model training procedure, said model training procedure comprising:

receiving historical data associated with a plurality of events, said historical data including media data and financial data; and
   analyzing said historical data to identify said plurality of predefined event classes.

5. The computerized method of claim 4, further comprising at least one method of measuring direction and strength of relationships and dependencies between variables and thus correlating said event and said historical data.

6. The computerized method of claim 1, wherein said financial instrument is at least one of a company stock, a corporate bond, a government bond, a commodity, and a derivative instrument.

7. The computerized method of claim 1, wherein said predicted financial impact of said event includes a predicted short term price movement of said financial instrument.

8. The computerized method of claim 1, wherein said generating, using a numerical model, a predicted financial impact of said event further comprises augmenting said current financial parameters of said financial instrument with additional financial data including at least one of:
   (i) financial data associated with the movement of an index associated with the industry associated with said financial instrument; and
   (ii) financial data associated with the movement of an index associated with the market associated with said financial instrument.

9. The computerized method of claim 8, further comprising:
   comparing normalized price movement data across at least one of an industry, a market and an asset class; and
   filtering out market influences not related to said event.

10. The computerized method of claim 5, further comprising:
    repeating said retrieving media data, said retrieving current financial parameters, said determining a correlation, said predicted business impact, and said predicted financial impact over a period of time; and
    updating said numerical model based on said repeating.

11. The computerized method of claim 5, wherein said determining a correlation uses quantitative parameters to compare and normalize different ones of said events within each of said predetermined event classes.

12. The computerized method of claim 5, wherein said determining a correlation uses at least one of structural equation modeling (SEM), path analysis, and factor analysis.

13. The computerized method of claim 1, wherein each of said predefined event classes includes at least a first parameter, said parameters extracted from historical data using at least one of a self-organizing map (SOM) and a clustering method.

14. The computerized method of claim 5, wherein said determining a correlation includes learning a correlation via back-propagation and said correlation is utilized for classification and prediction using multilayered feed-forward networks.

* * * * *

UNITED STATES PATENT AND TRADEMARK OFFICE
CERTIFICATE OF CORRECTION

| | | |
|---|---|---|
| PATENT NO. | : 8,069,101 B1 | Page 1 of 1 |
| APPLICATION NO. | : 11/308886 | |
| DATED | : November 29, 2011 | |
| INVENTOR(S) | : Goetz Van Groll et al. | |

It is certified that error appears in the above-identified patent and that said Letters Patent is hereby corrected as shown below:

On the Title Page, Item (73) Assignee:

Replace the Assignees' Residence (City and State or Country)

"London (GB)" with

-- Cayman Islands (KY) --

Signed and Sealed this

Nineteenth Day of June, 2012

David J. Kappos
*Director of the United States Patent and Trademark Office*